(12) United States Patent
Codilian et al.

(10) Patent No.: US 6,724,564 B1
(45) Date of Patent: Apr. 20, 2004

(54) SEEK DISTANCE DEPENDENT VARIABLE MAX VCM SEEK CURRENT TO CONTROL THERMAL RISE IN VCM'S

(75) Inventors: Raffi Codilian, Irvine, CA (US); David D. T. Nguyen, Fountain Valley, CA (US); David L. Whitaker, Laguna Beach, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 506 days.

(21) Appl. No.: 09/728,630

(22) Filed: Nov. 30, 2000

(51) Int. Cl.$^7$ ................................. G11B 5/596
(52) U.S. Cl. ................ 360/78.07; 360/78.04; 360/78.06; 360/78.09
(58) Field of Search .............. 360/78.01, 78.04, 360/78.06, 78.07, 78.09

(56) References Cited

U.S. PATENT DOCUMENTS

| | | | |
|---|---|---|---|
| 5,128,813 A | 7/1992 | Lee | |
| 5,268,804 A | * 12/1993 | Wallis | 360/78.04 |
| 5,412,809 A | * 5/1995 | Tam et al. | 713/324 |
| 5,594,603 A | 1/1997 | Mori et al. | |
| 6,369,972 B1 | * 4/2002 | Codilian et al. | 360/78.04 |

* cited by examiner

Primary Examiner—David Hudspeth
Assistant Examiner—Jason Olson
(74) Attorney, Agent, or Firm—Milad G. Shara, Esq.; Davin Stockwell; Alan W. Young, Esq.

(57) ABSTRACT

A disk drive and methods for preventing a coil in a voice coil motor from overheating due to the application of excess current. The disk drive comprises a servo control system. The servo control system is adapted for applying a current to a coil of the voice coil motor thereby causing the voice coil motor to move the head according to a seek distance. The servo control system generates a plurality of seek profiles for each of a plurality of seek distances and a plurality of current limits for the plurality of seek profiles. Each of the plurality of seek profiles defines a plan for controlling the current to be applied to the coil while the voice coil motor is operated over the seek distance. The plurality of current limits each define a maximum current allowed while controlling the current to be applied to the coil.

20 Claims, 8 Drawing Sheets

SEEK DISTANCE DEPENDENT VARIABLE MAX VCM SEEK CURRENT TO CONTROL THERMAL RISE IN VCM'S

BACKGROUND OF THE INVENTION

1. Field of the Invention

The present invention relates generally to enhancing the performance of disk drives by controlling thermal rise and, more particularly, to improved systems and methods for preventing a coil of a voice coil motor (VCM) from overheating by preventing excessive current from being applied to the coil.

2. Background of the Invention

A typical hard disk drive includes a head disk assembly (HDA) and a printed circuit board assembly (PCBA). The HDA includes at least one magnetic disk (disk), a spindle motor for rotating the disk, and a head stack assembly (HSA) that includes a read/write head with at least one transducer for reading and/or writing data. The HSA is controllably positioned by a servo system to read or write information from or to particular tracks on the disk. The typical HSA has three primary portions: (1) an actuator assembly that moves in response to the servo control system; (2) a head gimbal assembly (HGA) that extends from the actuator assembly and biases the head toward the disk; and (3) a flex cable assembly that provides an electrical interconnect with minimal constraint on movement.

A "rotary" or "swing-type" actuator assembly comprises a body portion that rotates on a pivot bearing cartridge between limited positions, a coil portion that extends from one side of the body portion to interact with one or more permanent magnets to form a VCM, and an actuator arm that extends from an opposite side of the body portion to support the HGA.

Within the HDA, the spindle motor rotates the disk or disks, that are the media to and from which the data signals are transmitted via the read write/head(s) on the gimbal attached to the load beam. The performance of the disk drive is largely dominated by its mechanical latencies. One such mechanical latency is the rotational latency of the drive, which is a function of rotational speed of the disk and hence of the spindle motor. Another such mechanical latency is the seek latency of the drive, which is a function of the speed at which the actuator radially moves across the disk.

Competitive pressures in the disk drive market have compelled disk drive designers and manufacturers to simultaneously boost performance and reduce cost. Historically, higher performance has been achieved by, for example, increasing the rotational speed of the spindle motor and/or performing faster seek operations. Faster seek operations, in turn, can be achieved by increasing the control current flowing through the VCM, thereby increasing the actuator's acceleration and deceleration as it moves across the disk. Excessive VCM control currents or control current profiles having a high average value, however, can cause the VCM assembly (typically overmolded with a plastic material) to overheat, causing damage to the coil and the drive. For example, when subjected to an instantaneous or average current that is beyond the VCM's design limitations, the coil can generate excessive heat with consequences such as delamination of the coil overmold material, or loss of rigidity, thus drooping and contacting adjacent magnets; and/or outgassing particulates into the disk drive enclosure, with deleterious results. Such outgassing from the coil overmold, coil insulators, and/or from other materials applied to the coil wires (such as wire insulators, for example) can occur even at relatively low temperatures (85° C., for example). A need, therefore, exists to monitor the temperature of the VCM coil and to prevent damage thereto.

One possible solution that addresses the need to prevent excessive VCM temperatures is to limit the VCM control current so that the heat generated therein remains at all times within conservative limits, independent of present actuator current usage patterns. This solution, while effectively preventing the VCM from overheating and obviating the need to monitor the temperature thereof, also results in unacceptably slow drive performance. Another solution is proposed in the U.S. Pat. No. 5,594,603, issued to Mori et al. In the Mori patent, the current applied to the VCM is used to calculate an approximation of the VCM temperature. This method attempts to mathematically model the thermal behavior of the VCM by devising a number of coefficients and by quantifying and inter-relating the VCM control current, the heat naturally radiated by the VCM, the ambient temperature, the thermal capacity of the VCM, and the ambient temperature thereof, among other factors. However, such a mathematical model, although providing an indication of the present VCM temperature, may not accurately provide a calculated temperature value that accords with the present and actual temperature of the VCM. Indeed, a number of factors can skew the results obtained from such mathematical models. For example, the present temperature of the drive or the resistance of the VCM coil may not remain constant and result in changing VCM control current magnitudes. As the VCM control current is used as the basis for the temperature calculations, the VCM is not driven (i.e., supplied with VCM control current) in an optimal manner and the actuator may not sweep as rapidly across the disk as it might otherwise have, thereby needlessly limiting the overall performance of the drive. Alternatively, should the mathematical model prove to be an inaccurate predictor of actual VCM temperature in certain situations, excessive VCM control currents can be generated, potentially causing damage to the VCM and to the drive. Over many iterations, recursively-applied mathematical models can cause a relatively small error in each calculation to grow to such a degree that the model no longer accurately reflects present operating conditions. Reliance upon such an inexact mathematical model in modulating the VCM control current can understandably result in less than optimal drive performance characteristics.

Another proposed solution is proposed in the U.S. Pat. No. 5,128,813, issued to Lee. In this patent, a discrete temperature-sensing element is used to dynamically sense the VCM temperature during the operation of the drive. The output of the temperature-sensing element (e.g., thermistor) is quantized and used to calculate a multiplication factor. The multiplication factor, in turn, is multiplied by a reference velocity command during a seek operation to produce a velocity command that then is compared with a feedback velocity value to generate an error signal that modulates the operation of the actuator (e.g., the VCM control current) during seek operations. This patent discloses that the thermistor is mounted for thermal conduction directly to the head and disk assembly. While the temperature sensing element can, in fact, provide a direct measurement of the temperature of the VCM (in contrast to the Mori patent above, for example), this method requires mounting a high precision thermistor to the HDA and requires that appropriate signal conditioning means be provided to measure, quantize and interpret the resistance thereof. In many aspects, however, disk drive designers and manufacturers operate in an environment that has acquired many of the characteristics of a commodity market. In such a market, the addition of even a single, inexpensive part can directly and adversely affect competitiveness. In this case, therefore, the addition of the thermistor and associated signal conditioning means discussed in the Lee patent would be of little practical value.

Other proposed solutions to prevent a coil of a VCM from overheating have included the addition of a dwell time between successive seek operations. By adding the dwell time, no current is applied to the coil for some period after each seek operation. As a result, the disk drive permits the coil to cool during the dwell time; however, no further seek operations can be commenced until the dwell time ends. Thereby, although the coil is provided with an opportunity to cool, the performance of the drive is adversely affected by increasing the average seek time.

Similarly, it has been proposed that the temperature of the coil can be controlled by selecting a fixed maximum current for all seek distances exceeding a certain seek distance and then adjusting the acceleration and deceleration intervals during which the fixed maximum current is applied to the coil. The fixed maximum current is applied to all seek distances over the certain seek distance without regard to the existence of a coast interval. The coast interval is a time period that occurs between the acceleration and deceleration intervals. At the end of the acceleration interval, the head has reached a maximum velocity, and the fixed maximum current is removed from the coil. The head then effectively "coasts" until the beginning of the deceleration interval when the fixed maximum current again is applied to the coil, but in an opposite direction, to decelerate the head. Since no current is applied to the coil as the head coasts, the coil is permitted to cool during the coast interval. As the coast interval increases with longer seek distances, the time during which the coil cools also increases. The proposed solution that uses fixed maximum current however does not take advantage of the increased cooling provided by the coast interval. Due to the increased cooling for the longer seek distances, the current applied to the coil for the longer seek distances can exceed the fixed maximum current, increasing the performance of the disk drive without causing the coil to overheat.

What are needed, therefore, are methods for preventing the application of excessive VCM control currents to a disk drive voice coil motor that are accurate, reliable and inexpensive in their implementation. More specifically, without relying upon complex and error prone mathematical modeling schemes or upon costly temperature sensing circuitry, methods for optimizing a maximum VCM control current to be applied to the voice coil motor for preselected seek distances are needed. Further, methods are needed for allowing the VCM control current to be modulated in an optimal manner to optimize seek operations.

SUMMARY OF THE INVENTION

The present invention is directed to a disk drive that provides the capability to prevent a coil of a voice coil motor from overheating due to the application of excessive current while moving a head over a recording surface of a disk.

A disk drive in accordance with an embodiment of the present invention comprises a disk with a recording surface, a head for reading and/or writing data on the recording surface, a voice coil motor for moving the head over the recording surface, and a servo control system. The servo control system applies a current to a coil of the voice coil motor, causing the head to move a seek distance over the recording surface of the disk. The servo control system generates a plurality of seek profiles for each of a plurality of seek distances and a plurality of current limits for the plurality of seek profiles. Each of the plurality of seek profiles defines a plan for controlling the current to be applied to the coil while the voice coil motor is operated over the seek distance. The plurality of current limits each define a maximum current allowed while controlling the current to be applied to the coil.

Each of the plurality of current limits is determined by examining a seek distance that represents one seek distance or a range of seek distances. For the seek distance, an appropriate seek profile and a nominal maximum current level are selected. The seek profile provides, among other things, time intervals during which the current is applied to the coil for the seek distance. The time intervals of the seek profile include an acceleration interval and a deceleration interval. If the seek distance exceeds a certain threshold length, typically thirty-five percent of full stroke, the seek profile also includes a coast interval, during which no current is applied to the coil. The nominal maximum current level comprises a starting point for determining the calculating the current limit for the seek distance and includes a nominal maximum acceleration current level and a nominal maximum deceleration current level.

A maximum stabilized RMS power for the seek distance then is calculated for the coil based upon several factors, including the acceleration interval, the deceleration interval, the nominal maximum acceleration current level, and the nominal maximum deceleration current level. If the maximum stabilized RMS power falls outside a preselected range of a maximum RMS power level for the coil, the nominal maximum acceleration current level and the nominal maximum deceleration current level each are adjusted, and the maximum stabilized RMS power is re-calculated. When the maximum stabilized RMS power is within the preselected range, the nominal maximum acceleration current level and the nominal maximum deceleration current level each, as adjusted, are stored as the current limit for the seek distance and, if desired, a next seek distance is examined. Once the current limit has been calculated for each of the plurality of seek distances, a current limit function, comprising the current limit for each seek distance, is generated. The current limit function may be generated in the form of a table, an equation, an algorithm, and/or any other form of generalized function, and, upon receiving a seek distance, produces a relevant current limit for the seek distance.

In operation, the servo control system receives a seek distance for moving the head over the recording surface. Upon receiving the seek distance, a relevant current limit, comprising a maximum acceleration current level and a maximum deceleration current level, is determined via the current limit function. The seek distance and the relevant current limit then are provided to a seek profile generator. In the seek profile generator, the relevant current limit is combined with a relevant seek profile, a seek profile from the plurality of seek profiles that is relevant to the seek distance. The relevant seek profile includes an acceleration interval, a deceleration interval, and, depending on the length of the seek distance, a coast interval. A current then is generated having a maximum amplitude substantially equal to the maximum acceleration current level during the acceleration interval and the maximum deceleration current level during the deceleration interval. No current is applied to the coil during the coast interval, if applicable. Once generated, the servo control system applies the current to the coil to move the head by the seek distance, maintaining the performance objectives of the disk drive but without exceeding the power handling capabilities of the coil.

DETAILED DESCRIPTION OF THE PREFERRED EMBODIMENTS

Figure 1:
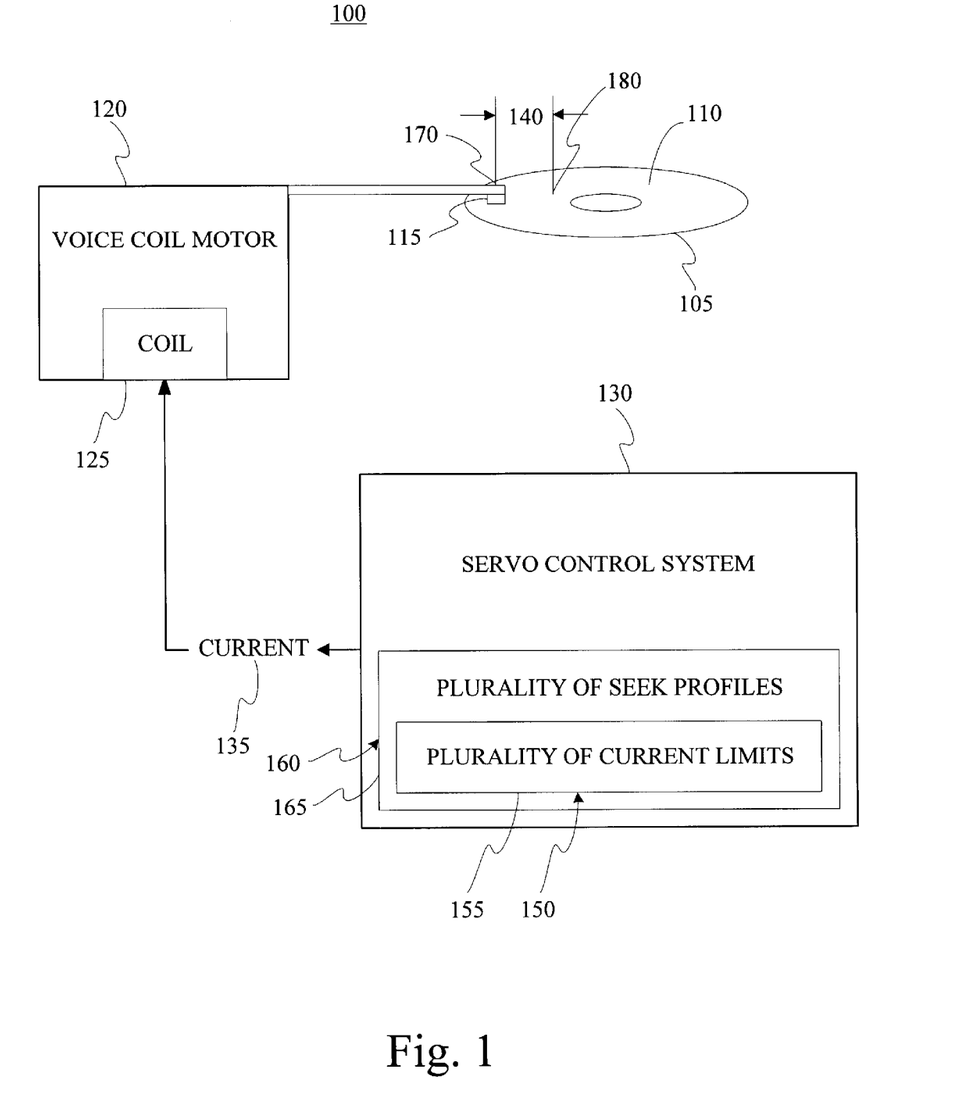
FIG. 1 is a block diagram illustrating a disk drive in accordance with the present invention.

Since a disk drive's performance can be adversely affected by reducing an amount of current applied to a coil of a voice coil motor, the use of a plurality of seek profiles in conjunction with a plurality of current limits can prove to be an advantageous method for preventing the coil from overheating. By adjusting both an amplitude and an application time of the current for each of a plurality of seek distances, the coil of the voice coil motor is prevented from overheating while maintaining performance objectives for seek operations. This result is achieved, according to one embodiment of the present invention, by employing a disk drive 100 as shown in FIG. 1.

The disk drive 100 comprises a disk 105, a head 115, a voice coil motor 120, and a servo control system 130. The disk 105 includes a recording surface 110 and is rotatably coupled with the disk drive 100. The head 115 extends over the recording surface 110 and may be employed to read data and/or to write data on the recording surface 110 of the disk 105. The head 115 also is movably coupled to the disk drive 100 via the voice coil motor 120. The voice coil motor 120 includes a coil 125, which is electrically coupled with the servo system 130, and moves the head 115 over the recording surface 110 of the disk 105 in accordance with a current 135 generated by the servo system 130.

The servo control system 130 includes a current limit function 150 for determining a relevant current limit for a seek distance 140. The current limit function 150 includes a plurality of current limits 155, each comprising a maximum acceleration current level and a maximum deceleration current level for each of a plurality of seek distances. Each maximum acceleration current level is a maximum current that should be applied to the coil 125 to accelerate the head 115 from a starting track 170 toward a destination track 180, located the seek distance 140 from the starting track 170; likewise, each maximum deceleration current level is the maximum current that can be applied to the coil 125 to decelerate the head 115 as the head 115 approaches the destination track 180 from the starting track 170. Whereas the current 135 travels through the coil 125 in a first direction to accelerate the head 115, the current 135 travels through the coil 125 in a second direction, opposite to the first direction, to decelerate the head 115. The current limit function 150 may be generated in the form of a table, an equation, an algorithm, and/or any other form of generalized function, and produces a relevant current limit upon receiving the seek distance 140. Further, each of the plurality of current limits 155 may be relevant to one seek distance and/or to a plurality, such as a range, of seek distances.

Figure 2A:
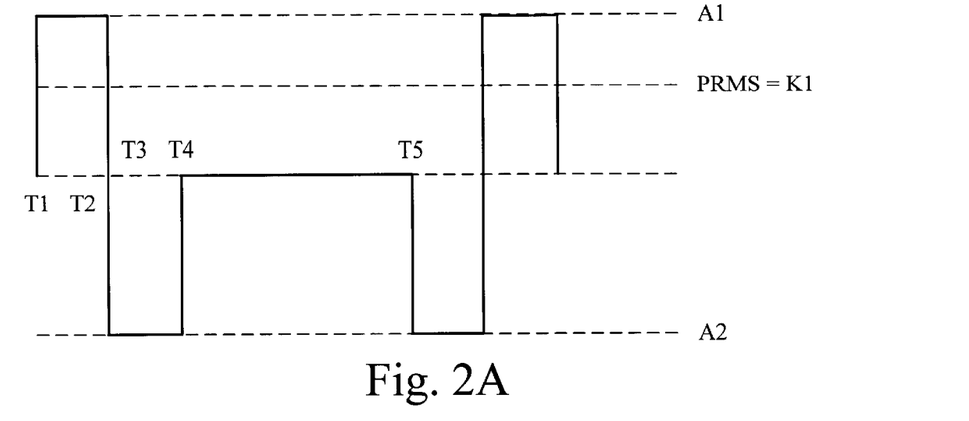
FIGS. 2A–D each are exemplary graphs illustrating the application of a current to a coil of a voice coil motor for various preselected seek distances.

Similarly, the servo control system 130 also includes a seek profile generator 160 for selecting a relevant seek profile for a seek distance 140. The seek profile generator 160 generates a plurality of seek profiles 165 for determining a rate and one or more time intervals for applying the current 135 to the coil 125. The plurality of seek profiles 165 each may be applicable to one seek distance and/or to a plurality, such as a range, of seek distances. As shown in FIG. 2C, the plurality of seek profiles 165 each includes an acceleration interval from T1 to T2 and a deceleration interval from T3 to T4. The current 135, termed an acceleration current when applied to the coil 125 during the acceleration interval, and a termed a deceleration current when applied to the coil 125 during the deceleration interval. For each preselected seek distance 140 that exceeds a certain threshold distance, typically based on a velocity limit which occurs at about thirty-five percent of full stroke, the plurality of seek profiles 165 also includes a coast interval from T2 to T3, during which no current 135 is applied to the coil 125. The seek profile generator 160 also shapes the current 135 during the acceleration interval and the deceleration interval, to minimize the effect of resonances.

Returning to FIG. 1, the seek profile generator 160 can determine the plurality of seek profiles 165 in real-time via, for example, an algorithm performed by a processing system as the disk drive 100 operates. Alternatively, the plurality of seek profiles 165 may be determined in advance according to the algorithm and stored in a table, for example, in a memory system, preferably comprising non-volatile memory, for subsequent retrieval during operation of the disk drive 100. The application of the plurality of current limits 155 and the plurality of seek profiles 165 prevents the coil 125 from overheating during the operation of the disk drive 100 while maintaining performance objectives for seek operations.

Figure 3:
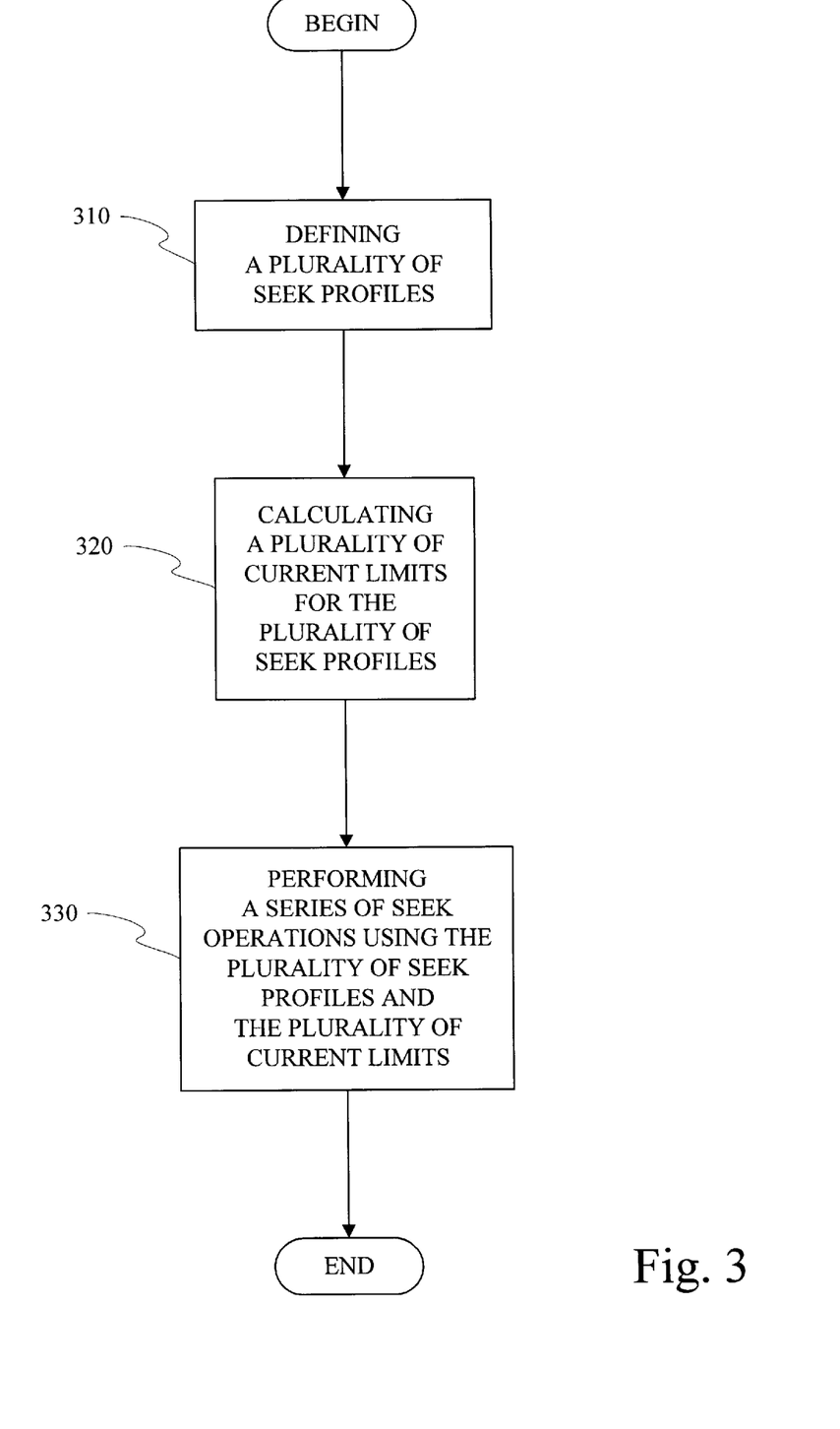
FIGS. 3, 4, 5, and 6 each are flow diagrams illustrating the steps in a method performed by the disk drive of FIG. 1.

In operation, a servo control system 130 can control a current 135 to be applied to a coil 125 in a voice coil motor 120 of a disk drive 100 as the voice coil motor 120 moves a head 115 over a recording surface 110 of a disk 105 as shown in FIG. 3. The servo control system 130 generates a plurality of seek profiles 165 in step 310 and calculates a plurality of current limits 155 for the plurality of seek profiles 165 in step 320. The servo control system 130 then performs a series of seek operations of varying seek distance 140 using the plurality of seek profiles 165 and the plurality of current limits 155 in step 330.

As described above, when defining the plurality of seek profiles 165 in step 310, the servo control system 130 determines a rate and at least one time interval for applying the current 135 to the coil 125. The plurality of seek profiles 165 each includes an acceleration interval and a deceleration interval. Also, each of the plurality of seek profiles 165, corresponding to a preselected seek distance 140 that reaches a velocity limit, has a coast interval during which the coil 125 is permitted to cool because little or no current 135 is being applied to the coil 125. The velocity limit is typically reached at approximately thirty-five percent of full stroke. At lower velocities, there is no coast interval. The application of current 135 to coil 125 further is shaped during the acceleration interval and the deceleration interval to minimize resonances.

Figure 4:
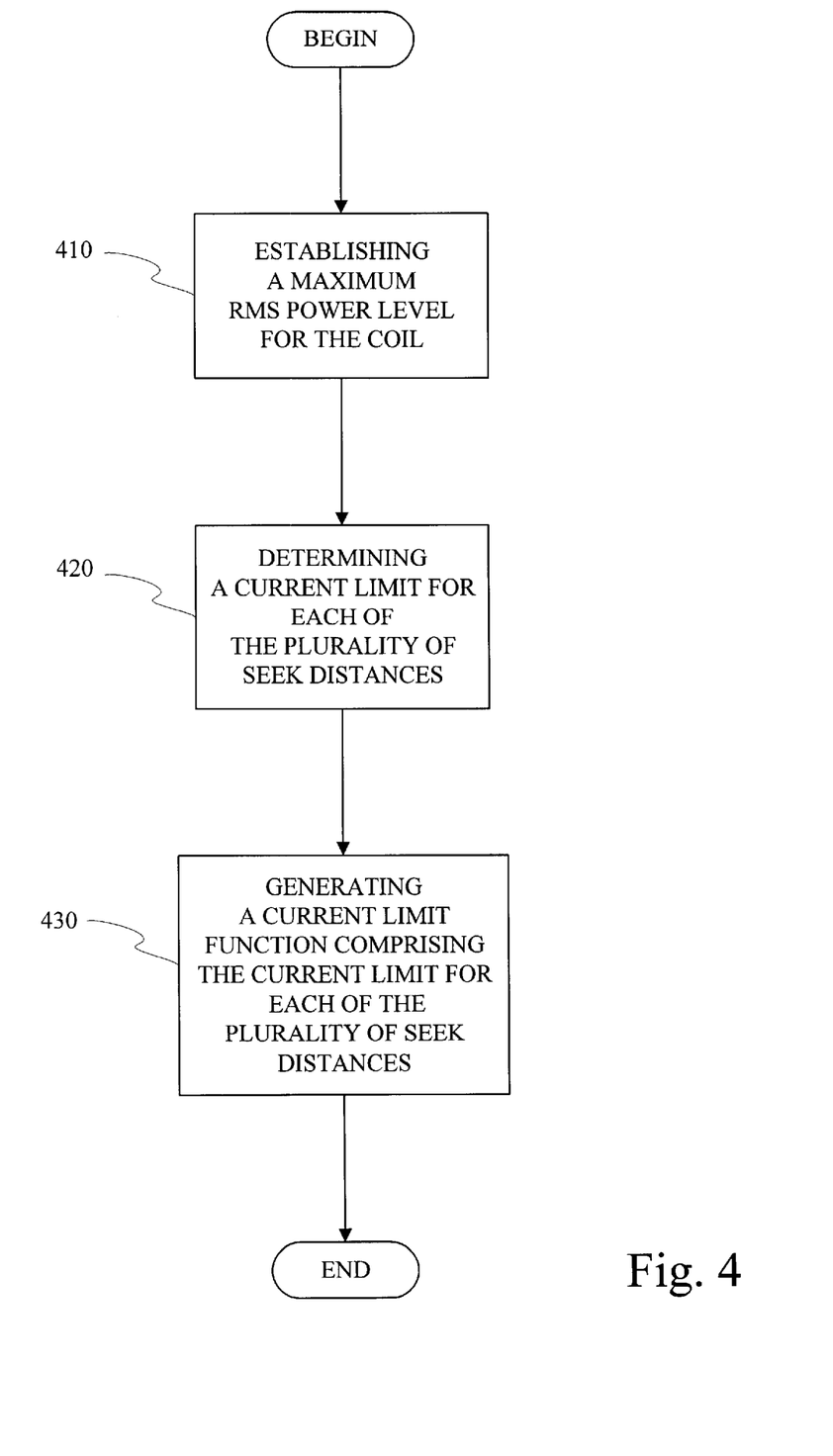

The plurality of current limits 155 for the plurality of seek profiles 165 then are calculated by the method illustrated in FIG. 4. The servo control system 130 establishes a maximum RMS power level for the coil 125 from a temperature handling capability of the coil 125 and a thermal rise of the coil 125 in step 410. The maximum RMS power level for the coil 125 is determined by a series of simulation runs performed to characterize the power-handing capacity for the coil 125. Since temperature is directly related to power, the simulation runs begin by applying a preselected current 135 to the coil 125 at an ambient temperature. The ambient temperature typically comprises a maximum temperature for the environment in which coil 125 is specified to operate, for example, 55° C. When the preselected current 135 is applied, the coil 125 will experience a thermal rise, and a coil winding resistance of the coil 125 will increase. After determining the thermal rise in the coil 125, a resultant temperature of the coil 125 is calculated by adding the thermal rise to the ambient temperature. The current 135 then is increased and again applied to the coil 125 with the increased coil winding resistance and at the resultant temperature, resulting in an additional thermal rise and an additional increase in the coil winding resistance of the coil 125. As the current 135 continues to be incrementally increased, the incremental thermal rise in the coil 125 and the incremental increase in the coil winding resistance both decrease for each successive increase in current 135. When the incremental thermal rise falls below a preselected limit, the temperature and coil winding resistance of the coil 125 both have substantially stabilized, and the simulation test is ended. The current 135 and the coil winding resistance of the coil 125 at the end of the simulation test each are recorded as a final current and a final coil winding resistance, respectively. The maximum RMS power level for the coil 125 is substantially equal to the product of a square of the final current and the final coil winding resistance.

Figure 5:
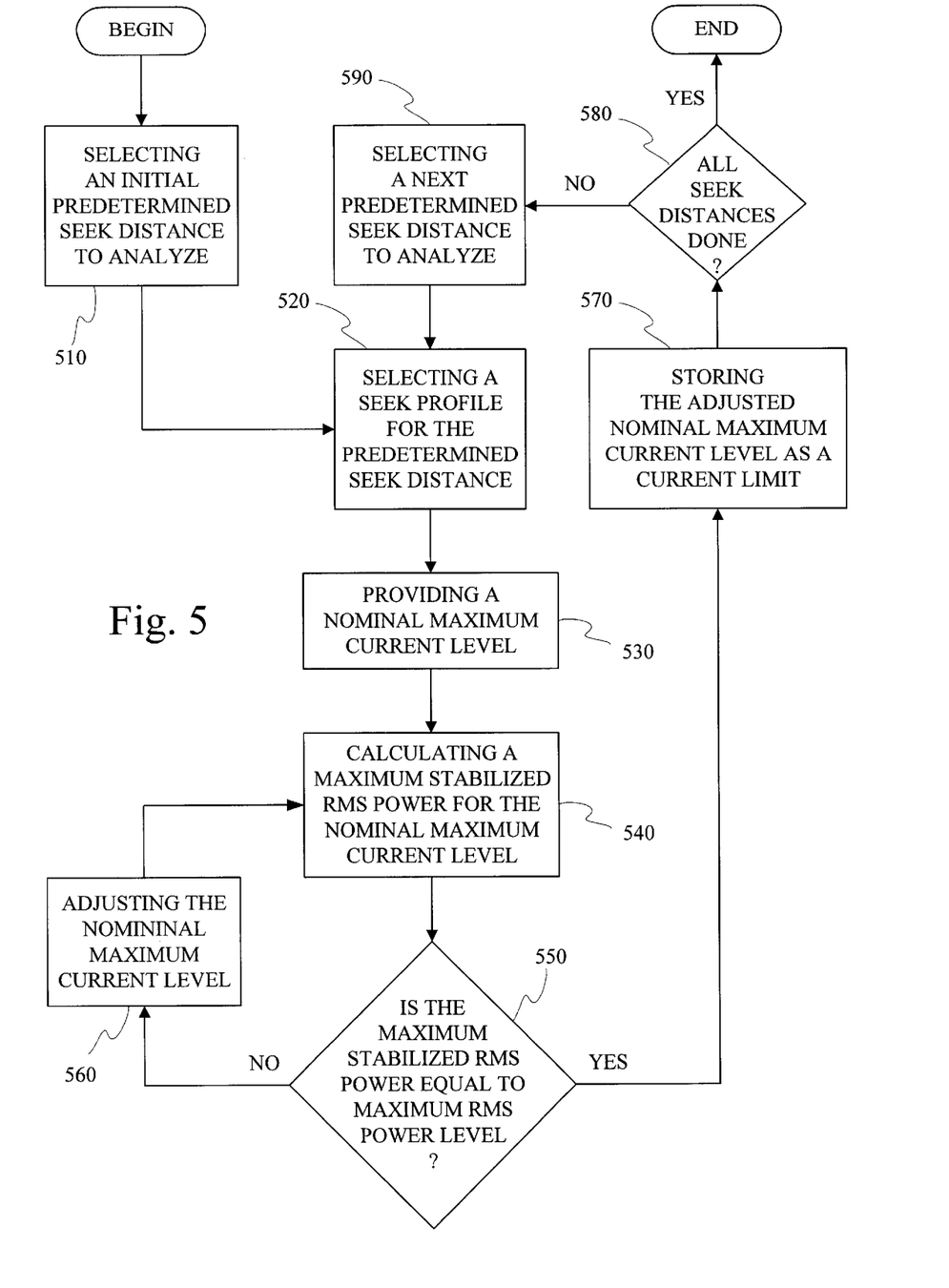

Based upon the maximum RMS power level for the coil 125, a current limit for each of the plurality of seek distances is determined in step 420. As shown in FIG. 5, each current limit is determined by first selecting an initial seek distance 140 to analyze in step 510. An appropriate seek profile then is selected from the plurality of seek profiles 165 for the initial seek distance 140 in step 520. The appropriate seek profile provides an acceleration interval, a deceleration interval, and/or a coast interval for the initial seek distance 140. After a nominal maximum current level, comprising a nominal maximum acceleration current level and a nominal maximum deceleration current level, has been provided in step 530, a maximum stabilized RMS power for the nominal maximum current level is calculated in step 540. The maximum stabilized RMS If power preferably is calculated in accordance with the equation:

$$P_{RMS} = \frac{\int_{BEGIN\ ACCEL}^{END\ ACCEL} i_a^2 dt R_w T + \int_{BEGIN\ DECEL}^{END\ DECEL} i_d^2 dt R_w T}{T_{ACCEL} + T_{COAST} + T_{DECEL} + T_{LATENCY} + T_{DWELL}} \quad \text{Equation 1}$$

where $i_a$ is the nominal maximum acceleration current level, $i_d$ is the nominal deceleration current level, T is the time current is applied and $R_w$ is the coil winding resistance. $T_{ACCEL}$, $T_{COAST}$, $T_{DECEL}$, $T_{LATENCY}$ and $T_{DWELL}$ are the lengths of the acceleration interval, the coast interval, the deceleration interval, a rotational latency time, and a dwell time, respectively.

The nominal maximum acceleration current level is applied to the coil 125 during the acceleration interval, and the nominal maximum deceleration current level is applied to the coil 125 during the deceleration interval. No current 135 is applied to the coil 125 during the coast interval, permitting the coil 125 to cool. As noted above, the coil winding resistance of the coil 125 exhibits a positive temperature coefficient, causing the coil winding resistance of the coil 125 to increase as the coil temperature rises.

Preferably, the coil winding resistance, as used in Equation 1, reflects a stabilized coil winding resistance and substantially comprises the final coil winding resistance described above.

The rotational latency time, $T_{LATENCY}$, is the time that the head 115 must wait while the disk 105 rotates such that a preselected sector is located substantially below the head 115. During the rotational latency time, the coil 125 cools because only small amounts of current 135 is applied to the coil 125 during track following. The average latency time is one-half of a time required for the disk 105 to complete a full revolution. The dwell time, $T_{DWELL}$, comprises an idle period of time between successive seek operations. As shown in FIG. 2A, the rotation latency time and the dwell time both occur during the time interval from T4 and T5. Since no current 135 is applied to the coil 125, the disk drive 100 permits the coil 125 to cool during the dwell time. Through the use of the concepts of the present invention, dwell times do not need to be inserted between successive seek operations to permit additional time for the coil 125 to cool. Thus, for purposes of step 540, the dwell time is assigned a zero value.

Once calculated for the nominal maximum current level in step 540, the maximum stabilized RMS power of the coil 125 is compared in step 550 with the maximum RMS power level that was established in step 410. If the maximum stabilized RMS power of the coil 125 does not fall within a preselected range below the maximum RMS power level, the nominal maximum current level is adjusted in step 560. The nominal maximum acceleration current level and/or the nominal maximum deceleration current level may be adjusted in step 560. The preselected range is substantially between a preselected percentage of the maximum RMS power level and the maximum RMS power level. The preselected range should not include any RMS power levels exceeding the maximum RMS power level. The preselected percentage of the maximum RMS power level is less than the maximum RMS power level and preferably is substantially equal to ninety-seven percent of the maximum RMS power level.

For example, if the maximum stabilized RMS power of the coil 125 exceeds the maximum RMS power level in step 550, the nominal maximum current level is decreased in step 560, and the maximum stabilized RMS power applied to the coil 125 in step 540 is recalculated based upon the nominal maximum current level, as decreased. These steps are repeated until the maximum stabilized RMS power of the coil 125 is substantially within the preselected range. Conversely, if the maximum RMS power level exceeds the stabilized RMS power of the coil 125 in step 550, the nominal maximum current level is increased in step 560. The maximum stabilized RMS power applied to the coil 125 in step 540 is recalculated based upon the nominal maximum current level, as increased, and these steps are repeated until the maximum stabilized RMS power of the coil 125 is substantially within the preselected range.

Once the maximum stabilized RMS power of the coil 125 based upon the nominal maximum current level, as adjusted in step 560, is substantially within the preselected range, the nominal maximum current level is stored as a current limit in the plurality of current limits 155 and associated with the initial seek distance 140 in step 570. The plurality of current limits 155 may be stored and retained in any format. Upon storing and retaining the current limit for the initial seek distance 140, the plurality of current limits 155 are examined for completeness in step 580, and, if desired, a next preselected seek distance 140 can be selected to be analyzed in step 590. The current limit may be calculated for all possible seek distance 140 for the disk drive 100 or for selected seek distances 140. Further, a specific current limit may be defined to apply to a single seek distance or to a plurality, such as a range, of seek distances.

Figure 7:
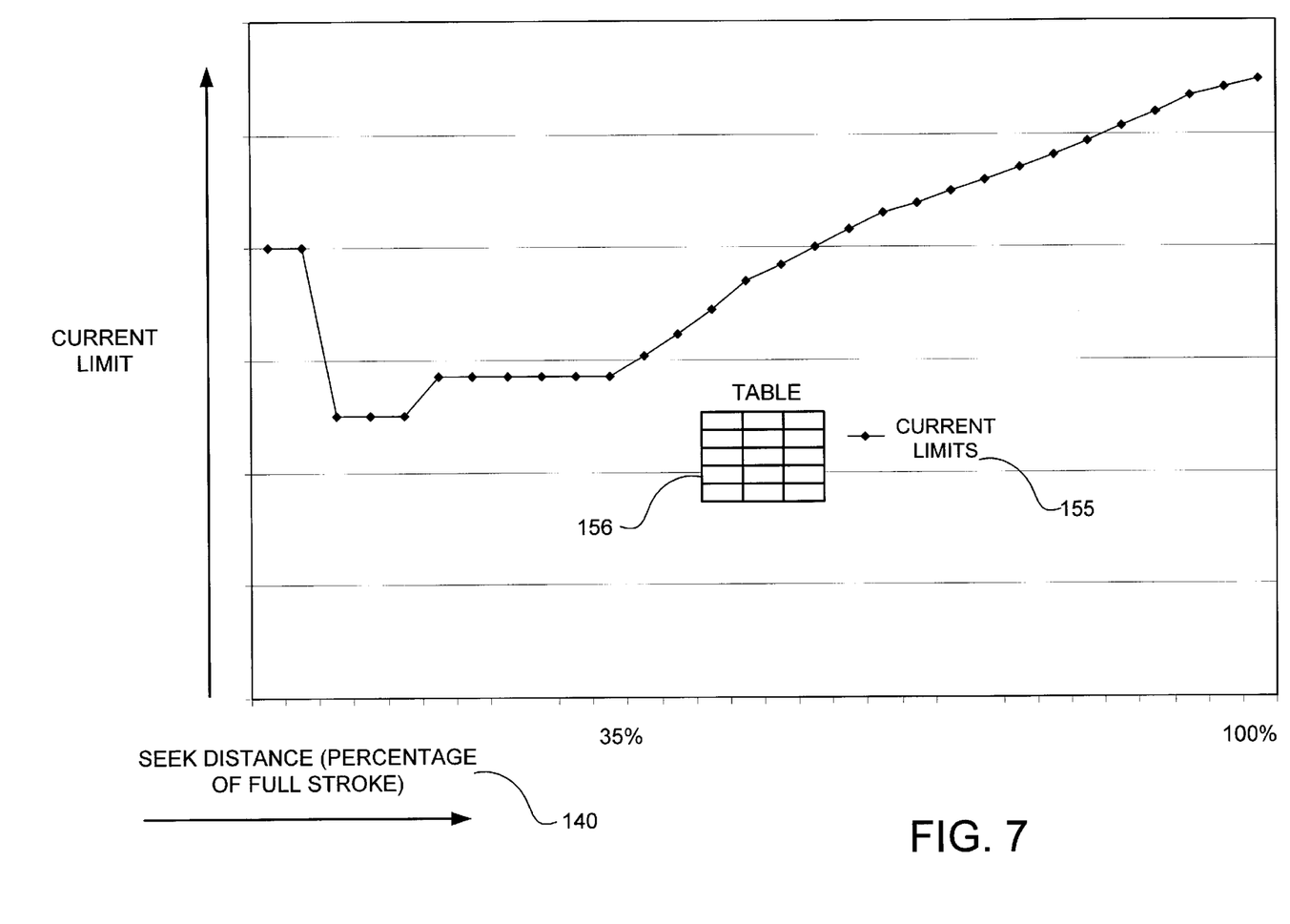
FIG. 7 is a graph of coil current limits as a function of seek distance in accordance with the present invention.

A graph of the plurality of current limits 155 for the coil 125 as a function of seek distance 140 is shown in FIG. 7. As shown by the graph, the current limits for very short seek distances, such as track-to-track seeks, are relatively high because the current 135 is applied to the coil 125 during acceleration intervals and deceleration intervals that are relatively short. For seek lengths which are below the velocity limit point at which a coast interval is applied, the current limits are relatively low in order to maintain coil temperature below a critical point. Beyond the velocity limit point, approximately 35% of full stroke, the coast interval applies, permitting the coil 125 to cool during the coast interval. As the seek distance 140 continues to increase to full stroke, the coast interval and the current limits both also increase. As the coil 125 is permitted to cool for increasingly longer periods of time, higher current limits can be permitted during the acceleration interval and the deceleration interval as shown in FIG. 7. Preferably, a table 156 is used to store the current limits, indexed by seek length.

Figure 2B:
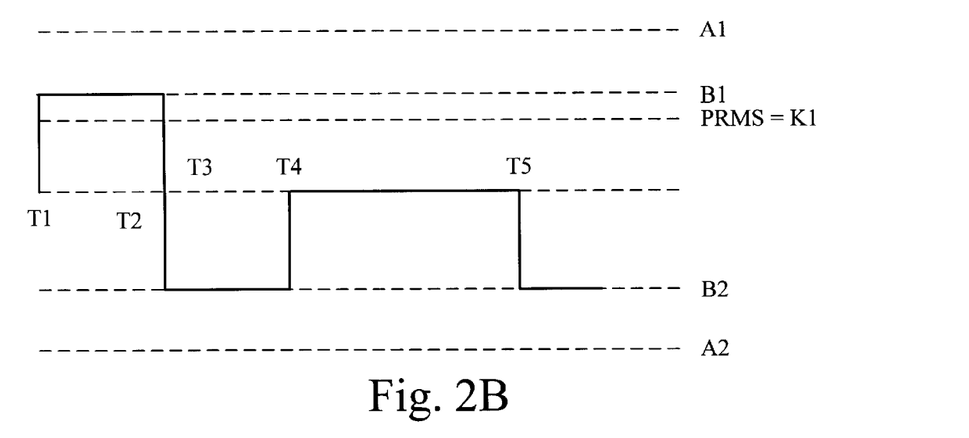
Figure 2C:
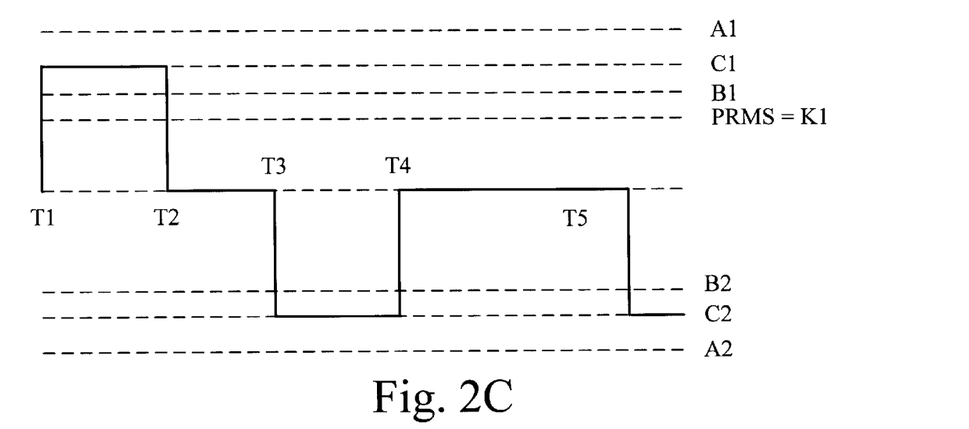
Figure 2D:
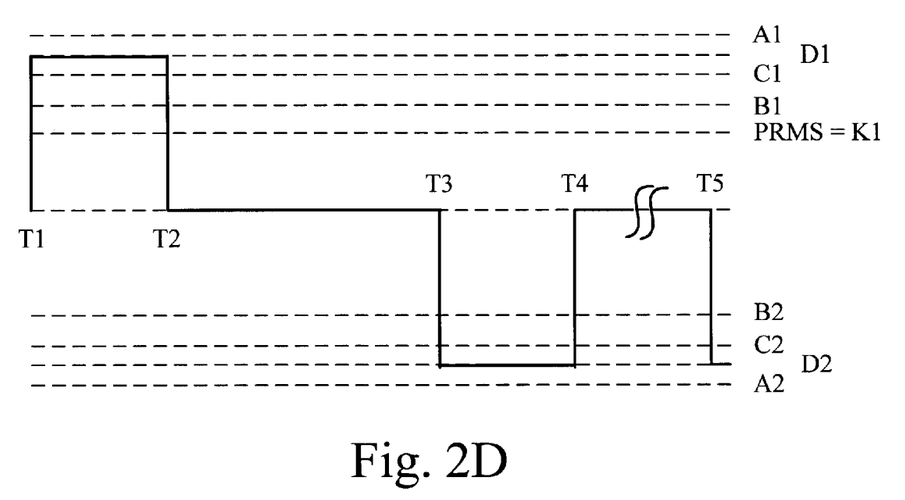

FIGS. 2A–2D show the current cycle for a range of seek distances 140 from a track-to-track seek, as in FIG. 2A, to a full stroke seek, as in FIG. 2D. In FIG. 2A, since the current 135 is applied for a short period of time, current limits A1 and A2 of the current 135 comprise a current limit imposed by the servo control system 130. The current 135 is applied to the coil 125 for a short period of time and generates a RMS power PRMS that is substantially equal to a constant K1. In contrast, FIG. 2B shows a current cycle for a longer seek distance 140. As the seek distance 140 approaches approximately thirty-five percent of the full stroke for the disk 105, current limits B1 and B2 decrease from the current limit A1 and A2, respectively, because the current 135 is applied to the coil 125 for a longer period of time. As result, the RMS power PRMS being generated in the coil 125 remains at a constant K1. Further, the coil 125 is not subject to a coast interval, preventing the coil 125 from cooling during the seek operation. The current limits B1 and B2 represent the minimum current limits in the plurality of current limits 155 as shown in FIG. 7.

IF The coil 125 is subject to a coast interval beginning in FIG. 4C because the seek length 140 is sufficient to reach a velocity limit. The voice coil motor 120 moves the head 115 across the recording surface 110 of the disk 105 by applying the current 135 with current limits C1 and C2 to the coil 125. Since the coil 125 is permitted to cool during the coast interval, the current limits C1 and C2 of the current 135 begin to increase from the current limits B1 and B2, respectively, as the seek distance 140 increases. The maximum seek distance 140 occurs when the seek distance 140 is substantially equal to the full stroke for the disk 105 as shown in FIG. 2D. At full stroke, current limits D1 and D2 for the current 135 increase from the current limit C1 and C2, respectively, because the coast time during which the coil 125 is permitted to cool also increases. Since the coil 125 has a longer period of time to cool, the current limits D1 and D2 of the current 135 increase during the acceleration and deceleration periods, respectively. These changes in the respective current limits with respect to the seek distance 140 preferably are reflected in the plurality of current limits 155 in the current limit function 150.

Returning to FIG. 4, once the plurality of seek profiles 165 have been defined as in step 310 and the plurality of current limits 155 have been calculated as in step 320, a current limit function 150 then is generated in step 430. The current limit function 150 comprises the current limit for each of the plurality of seek distances, selected seek distances, and/or at least one range of seek distances. The current limit function 150 may be generated in the form of a table, an equation, an algorithm, and/or any other form of generalized function, and, upon receiving a preselected seek distance 140, produces a relevant current limit for the preselected seek distance 140. Upon receiving the preselected seek distance 140, the current limit function 150 responds with a relevant current limit.

The current limit function 150 may determine the relevant current limit for the preselected seek distance 140 in real-time via, for example, an algorithm performed by a processing system. Alternatively, the current limit function 150 may comprise a table of pre-calculated current limits. If the current limit function 150 comprises the table, each of the plurality of current limits 155 is discretely stored and associated with the appropriate seek distance 140 or the appropriate range of seek distances. The current limit function 150 can interpolate between the current limits of two seek distances if no current limit has been associated with the preselected seek distance 140. The servo control system 130 may include a memory system for storing the table. The memory system preferably comprises non-volatile memory.

Figure 6:
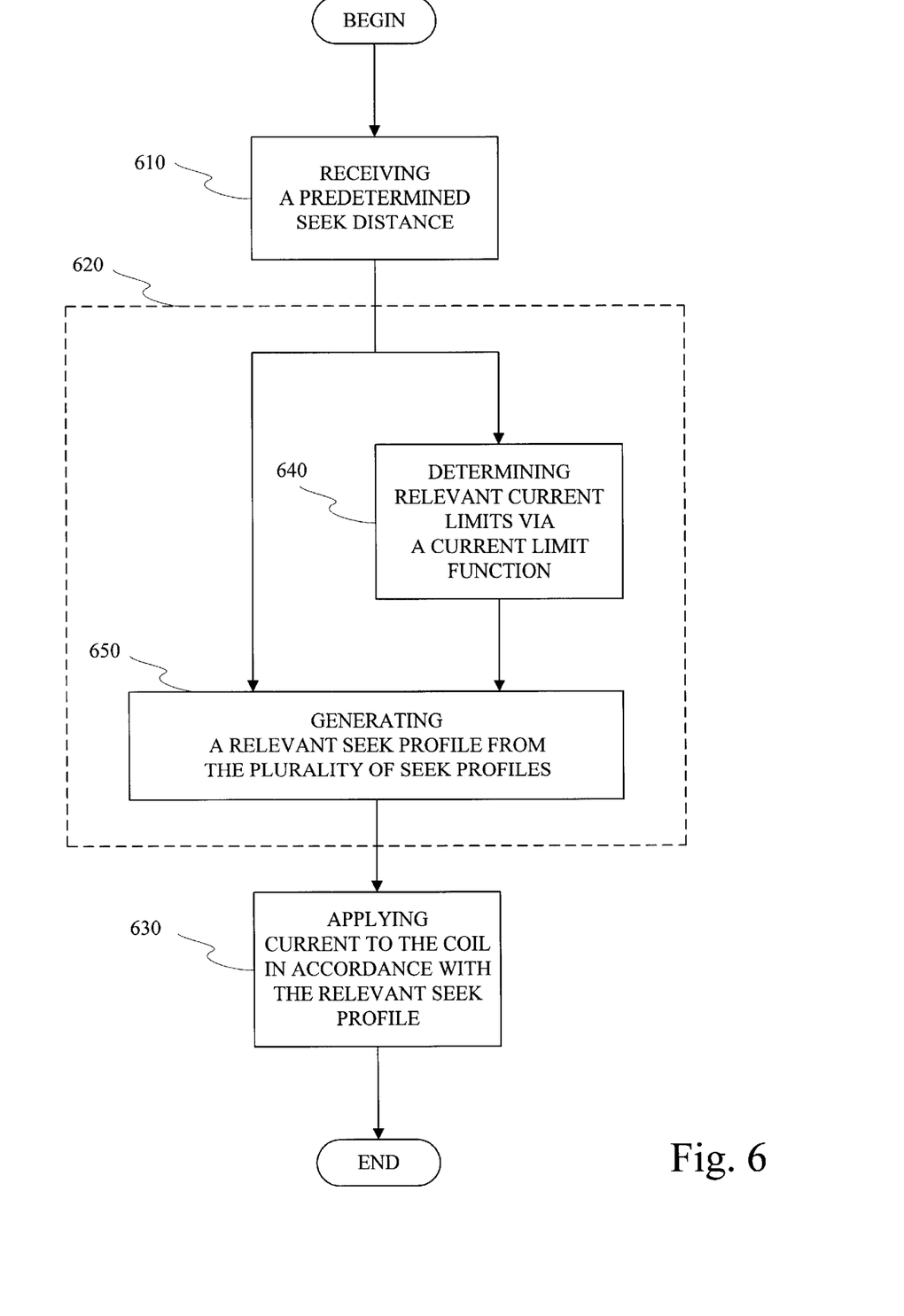

The steps for performing the series of seek operations of varying seek distance 140 as described in step 330 is shown in FIG. 6. Upon receiving a seek distance 140 in step 610, the servo control system 130 generates a relevant seek profile for the seek distance 140 in step 620. The relevant seek profile is relevant to the seek distance 140 and includes a relevant current limit. To generated the relevant seek profile, the servo control system 130 provides the seek distance 140 to the current limit function 150. The current limit function 150 then determines a relevant current limit for the seek distance 140 in step 640. The relevant current limit includes a relevant acceleration current limit and a relevant deceleration current limit and may be determined in real-time via, for example, an algorithm as the disk drive 100 operates or via a table that was compiled prior to the operation of the disk drive 100.

Once the relevant current limit has been determined, the servo control system 130 provides the seek distance 140 and the relevant current limit to a seek profile generator 160 to generate a relevant seek profile in step 650. The seek profile generator 160 selects a relevant seek profile from the plurality of seek profiles 165 and generates a current 135 for the coil 125. The relevant seek profile includes an acceleration interval, a deceleration interval, and, if appropriate, a coast interval. The current 135 comprises an acceleration current and a deceleration current. The acceleration current is applied during the acceleration interval of the relevant seek profile and has a maximum amplitude substantially equal to the relevant acceleration current limit. Similarly, the deceleration current is applied during the deceleration interval of the relevant seek profile and has a maximum amplitude substantially equal to the relevant deceleration current limit. The relevant seek profile may be generated in real-time during the operation of the disk drive 100 or may be pre-calculated and, for example, stored in a table. The seek profile generator 160 also shapes the current 135 during the acceleration interval and the deceleration interval, ramping the amplitude of the current 135 up toward the relevant current limit and back down to prevent an occurrence of undesired consequences, such as resonances. Little or no current 135 is applied to the coil 125 during the coast interval. After the current 135 has been generated, the servo control system 130 applies the current 135 to the coil 125 in step 630.

What is claimed is:

1. A disk drive, comprising:
   a disk, the disk having a recording surface;
   a head for reading and writing data on the recording surface;
   a voice coil motor for moving the head over the recording surface, the voice coil motor having a coil; and
   a servo control system for applying a current to the coil to cause the voice coil motor to move the head according to a seek distance, the servo control system generating a plurality of seek profiles for each of a plurality of seek distances and a plurality of current limits for the plurality of seek profiles, each of the plurality of seek profiles defining a plan for controlling the current to be applied to the coil while the voice coil motor is operated over the seek distance, each of the plurality of current limits defining a maximum current allowed while controlling the current to be applied to the coil, the servo control system including a seek profile generator for determining a relevant seek profile for each of the plurality of seek distances, the relevant seek profile being relevant to the seek distance, the seek profile generator including a table for storing the plurality of seek profiles, the table comprising a current limit for at least one range of seek distances within the plurality of seek distances,
   wherein the plurality of current limits can prevent the coil from overheating while maintaining performance objectives for seek operations.

2. The disk drive of claim 1, wherein the seek profile generator determines the plurality of seek profiles in real-time in accordance with an algorithm.

3. The disk drive of claim 1, wherein the seek profile generator preprocesses the plurality of seek profiles in accordance with an algorithm.

4. The disk drive of claim 1, wherein the servo control system includes a memory system for retaining the table.

5. A method for controlling a current applied to a coil in a voice coil motor of a disk drive, wherein the current is controlled by a servo control system and the voice coil motor moves a head over a recording surface of a disk in accordance with a plurality of seek distances, the method comprising the steps of:
   defining a plurality of seek profiles for the plurality of seek distances, the plurality of seek profiles each depending upon one of the plurality of seek distances and defining a plan for controlling the current to be applied to the coil during an acceleration interval, a deceleration interval, and a coast interval;
   calculating a plurality of current limits for each of the plurality of seek profiles, the plurality of current limits each being defined such that an integration of power consumed by the coil during seek operations of varying length is substantially constant; and
   performing a series of seek operations of varying seek distances using the plurality of seek profiles and the plurality of current limits.

6. The method of claim 5, wherein the stop of performing comprises the steps of:
   receiving a seek distance for moving the head over the recording surface;
   generating a relevant seek profile from the plurality of seek profiles, the relevant seek profile being relevant to the seek distance and including a relevant current limit; and
   applying the current to the coil, the current substantially complying with the relevant seek profile.

7. The method of claim 6, wherein the step of generating comprises the steps of:
   determining the relevant current limit via a current limit function; and
   selecting the relevant seek profile via a seek profile generator.

8. The method of claim 5, wherein the step of calculating includes the steps of:
   establishing a maximum RMS power level for the coil from a temperature handling capability of the coil and a thermal rise of the coil;
   determining a current limit for each of the plurality of seek distances based upon the maximum RMS power level for the coil; and
   generating a current limit function, the current limit function comprising the current limit for each of the plurality of seek distances.

9. The method of claim 8, wherein the step of generating comprises the step of including the current limit for at least one range of seek distances in the current limit function.

10. The method of claim 8, wherein the step of generating comprises the step of generating the current limit function in a table, the table being indexed by the plurality of seek distances.

11. The method of claim 8, wherein the step of generating comprises the step of generating the current limit function by preparing an equation for calculating a relevant current limit based upon one of the plurality of seek distances.

12. The method of claim 8, wherein the step of determining includes the steps of:
    selecting a preselected seek distance from the plurality of seek distances;
    providing a nominal maximum current level for the preselected seek distance;
    calculating a maximum stabilized RMS power applied to the coil for the nominal maximum current level, the maximum stabilized RMS power being calculated for a stabilized coil winding resistance at an ambient temperature, the ambient temperature substantially comprising a maximum specification temperature for the coil;
    comparing the maximum stabilized RMS power to the maximum RMS power level;
    adjusting the nominal maximum current level for the preselected seek distance if the maximum stabilized RMS power is outside a preselected range, the preselected range being substantially between a preselected percentage of the maximum RMS power level and the maximum RMS power level; and
    repeating the steps of calculating, comparing, and adjusting until the maximum stabilized RMS power is substantially within the preselected range.

13. The method of claim 12, wherein the step of adjusting comprises the step of increasing the nominal maximum current level if the maximum stabilized RMS power is less than the preselected percentage of the maximum RMS power level.

14. The method of claim 12, wherein the step of adjusting comprises the step of decreasing the nominal maximum current level if the maximum stabilized RMS power exceeds the maximum RMS power level.

15. The method of claim 12, further comprising the step of storing the nominal maximum current level in the plurality of seek profiles as a current limit for the preselected seek distance.

16. The method of claim 12, further comprising the step of performing the steps of providing, calculating, comparing, adjusting, and repeating for each of the plurality of seek distances.

17. A disk drive, comprising:
- a disk, the disk having a recording surface;
- a head for reading and writing data on the recording surface;
- (a voice coil motor for moving the head over the recording surface, the voice coil motor having a coil; and
- a servo control system for applying a current to the coil to cause the voice coil motor to move the head according to a seek distance, the servo control system generating a plurality of seek profiles for each of a plurality of seek distances and a plurality of current limits for the plurality of seek profiles, each of the plurality of seek profiles defining a plan for controlling the current to be applied to the coil while the voice coil motor is operated over the seek distance, each of the plurality of current limits defining a maximum current allowed while controlling the current to be applied to the coil, the servo control system including a seek profile generator for determining a relevant seek profile for each of the plurality of seek distances, the relevant seek profile being relevant to the seek distance, the seek profile generator including a table for storing the plurality of seek profiles, the servo control system includes a memory system for retaining the table,
- wherein the plurality of current limits can prevent the coil from overheating while maintaining performance objectives for seek operations.

18. The disk drive of claim 17, wherein the seek profile generator determines the plurality of seek profiles in real-time in accordance with an algorithm.

19. The disk drive of claim 17, wherein the seek profile generator preprocesses the plurality of seek profiles in accordance with an algorithm.

20. The disk drive of claim 17, wherein the table comprises a current limit for at least one range of seek distances within the plurality of seek distances.

* * * * *